United States Patent
Alexander et al.

(10) Patent No.: US 8,645,669 B2
(45) Date of Patent: Feb. 4, 2014

(54) CRACKING DESTRUCTIVELY OVERLAPPING OPERANDS IN VARIABLE LENGTH INSTRUCTIONS

(75) Inventors: Khary J. Alexander, Poughkeepsie, NY (US); Fadi Busaba, Poughkeepsie, NY (US); Brian Curran, Saugerties, NY (US); Bruce Giamei, Poughkeepsie, NY (US); Christian Jacobi, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 12/774,299

(22) Filed: May 5, 2010

(65) Prior Publication Data

US 2011/0276764 A1    Nov. 10, 2011

(51) Int. Cl.
*G06F 9/30*    (2006.01)
(52) U.S. Cl.
USPC ........................................ 712/210
(58) Field of Classification Search
USPC ........................................ 712/210
See application file for complete search history.

(56) References Cited

U.S. PATENT DOCUMENTS

| | | | |
|---|---|---|---|
| 4,604,684 A | 8/1986 | Epstein | |
| 4,652,991 A * | 3/1987 | Yamano | 711/201 |
| 4,853,840 A | 8/1989 | Shibuya | |
| 4,858,104 A | 8/1989 | Matsuo et al. | |
| 4,873,629 A | 10/1989 | Harris et al. | |
| 5,073,855 A | 12/1991 | Staplin et al. | |
| 5,150,468 A | 9/1992 | Staplin et al. | |
| 5,297,266 A * | 3/1994 | Tanaka | 711/214 |
| 5,434,985 A | 7/1995 | Emma et al. | |
| 5,467,473 A * | 11/1995 | Kahle et al. | 712/23 |
| 5,488,707 A * | 1/1996 | Phillips et al. | 711/200 |

(Continued)

FOREIGN PATENT DOCUMENTS

| | | |
|---|---|---|
| EP | 378816 | 12/1989 |
| EP | 374830 A3 | 3/1992 |

(Continued)

OTHER PUBLICATIONS

Angiulli et al., Exclusive OR Performance Enhancement, IBM TDB, Sep. 1, 1981, TDB Sep. 1981 p. 1852-1854.*

(Continued)

*Primary Examiner* — Andrew Caldwell
*Assistant Examiner* — Yuqing Xiao
(74) *Attorney, Agent, or Firm* — Fleit Gibbons Gutman Bongini & Bianco PL; Thomas Grzesik

(57) ABSTRACT

A method, information processing system, and computer program product manage computer executable instructions. At least one machine instruction for execution is received. The at least one machine instruction is analyzed. The machine instruction is identified as a predefined instruction for storing a variable length first operand in a memory location. Responsive to this identification and based on fields of the machine instruction, a relative location of a variable length second operand of the instruction with location of the first operand is determined. Responsive to the relative location having the predefined relationship, a first cracking operation is performed. The first cracking operation cracks the instruction into a first set of micro-ops (Uops) to be executed in parallel. The first set of Uops is for storing a first plurality of first blocks in the first operand. Each of said first block to be stored are identical. The first set Uops are executed.

24 Claims, 8 Drawing Sheets

(56) References Cited

U.S. PATENT DOCUMENTS

| | | | |
|---|---|---|---|
| 5,500,947 | A | 3/1996 | Uhler et al. |
| 5,664,215 | A | 9/1997 | Burgess et al. |
| 5,666,506 | A | 9/1997 | Hesson et al. |
| 5,694,565 | A | 12/1997 | Kahle et al. |
| 5,717,910 | A | 2/1998 | Henry |
| 5,721,855 | A * | 2/1998 | Hinton et al. ............... 712/218 |
| 5,742,805 | A | 4/1998 | Kalkarni et al. |
| 5,752,273 | A | 5/1998 | Nemirovsky et al. |
| 5,781,752 | A | 7/1998 | Moshovos et al. |
| 5,826,089 | A | 10/1998 | Ireton |
| 5,867,684 | A | 2/1999 | Kahle et al. |
| 5,909,567 | A | 6/1999 | Novak et al. |
| 5,918,031 | A | 6/1999 | Morrison et al. |
| 6,092,185 | A * | 7/2000 | Slegel et al. ............... 712/219 |
| 6,134,646 | A | 10/2000 | Feiste et al. |
| 6,219,742 | B1 | 4/2001 | Stanley |
| 6,336,183 | B1 | 1/2002 | Le et al. |
| 6,654,869 | B1 | 11/2003 | Kahle et al. |
| 6,697,939 | B1 | 2/2004 | Kahle |
| 6,999,952 | B1 | 2/2006 | Pham |
| 7,082,517 | B2 | 7/2006 | Busaba et al. |
| 7,085,917 | B2 | 8/2006 | Busaba et al. |
| 7,159,102 | B2 | 1/2007 | Irie et al. |
| 7,162,621 | B2 | 1/2007 | Kissell |
| 7,269,715 | B2 | 9/2007 | Le et al. |
| 2002/0152259 | A1 | 10/2002 | Trong et al. |
| 2005/0223292 | A1 | 10/2005 | Lee et al. |
| 2006/0053343 | A1 | 3/2006 | Hayem |
| 2007/0204138 | A1 | 8/2007 | Savransky et al. |
| 2007/0288725 | A1 | 12/2007 | Luick |
| 2009/0210659 | A1 | 8/2009 | Carlough et al. |
| 2009/0240914 | A1 | 9/2009 | Malley et al. |
| 2009/0240919 | A1 | 9/2009 | Alexander et al. |

FOREIGN PATENT DOCUMENTS

| | | |
|---|---|---|
| JP | 2000259408 A | 9/2000 |
| JP | 2001229024 A2 | 8/2001 |
| JP | 2004342102 A2 | 12/2004 |

OTHER PUBLICATIONS

Ngai et al., Fast Destructive Overlap Move Instruction Exection Algorithm, IBM TDB, Dec. 1, 1982, TDB Dec. 1982, p. 3569-3576.*

Ngai et al., Destructive Overlap Detection Hardware, IBM TDB, Jun. 1, 1976, TDB Jun. 1976 p. 61-64.*

Gwennap, "Intel's P6 Uses Decoupled Superscalar Design", Feb. 1995, Microprocessor Report, vol. 9, No. 2, pp. 1-7.*

International Search Report and Written Opinion dated Aug. 29, 2011 for PCT/EP2011/056429.

Flynn, Michael J., Instruction Sets and Their Implementations. IEEE., Dec. 27-29, 1990. pp. 1-6. EE Department, CSL. Stanford, CA.

Gschwind, Michael et al., Binary Translation and Architecture Convergence Issues for IBM System/390. In Preceedings of ICS-2000 Sante Fe, New Mexico, Aug. 8-10, 2000., pp. 1-12.

Ziv, Abraham et al., Solving Range Constraints for Binary Floating Instructions. Jun. 15-18, 2003. pp. 1-7. Haifa University. International Business Machines Research Labs. Haifa, Israel.

Busaba, Fadi et al., The Design of the Fixed Point Unit for z990 Microprocessor. Apr. 26-28, 2004. pp. 1-4. GLSVLSI' 04. Boston, MA.

Gideon D, Intrater and Iian Y. Spikkinger. Performance Evaluation of a Decoded Instruction Cache for Variable Instruction Length Computers. IEEE. Oct. 2004., pp. 1-11.

Quan, Gang et al., High Level Synthesis for Large Bit Width Multipliers on FPGAS: A Case Study. Sep. 19-21, 2005. pp. 1-6. Codes+ISSS' 05. New Jersey City, NJ.

Rizo-Morente, Jose et al.. Dynamic Current Modeling at the Instruction Level. Oct. 4-6, 2006. pp. 1-6. ISLPED' 06. Tegernsee, Germany.

Non-Final Office Action dated Apr. 4, 2013 received for U.S. Appl. No. 12/718,685, 16 pages.

Non-Final Office Action dated Dec. 21, 2012 received for U.S. Appl. No. 12/695,687, 25 pages.

Final Office Action dated Aug. 19, 2013 received for U.S. Appl. No. 12/695,687, 22 pages.

* cited by examiner

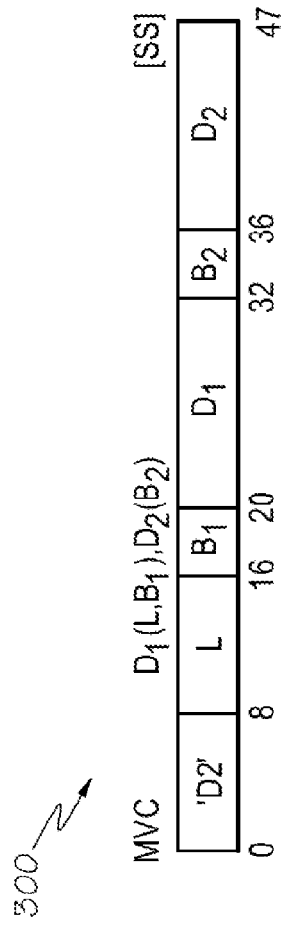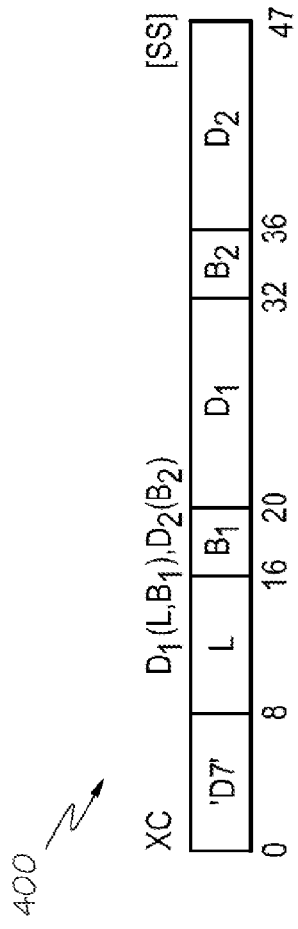

```
Crack to 3 Uops.
Uop1: sGR → Op2, LDQ, STQ
Uop2: Store → sGR,         STB
Uop3: Pretest Op1 ending address
```

FIG. 6

```
Crack to 2 Uops.
Uop1: Store → 0's
Uop2: Pretest Op1 ending address
```

FIG. 7

MVC INSTRUCTION

```
          ┌─────────────────────────────────┐
          │ Crack to 2 Uops.                │
   1002 ──┤─ Uop1: sGR ← Op2,    LDQ, STQ   │    LENGTH = 0 TO 7
   1004 ──┤─ Uop2: Store ← sGR,       STB   │
          └─────────────────────────────────┘
```

FIG. 10

```
          ┌─────────────────────────────────┐
          │ Expand to 4 Uops.               │
   1102 ──┤─ Uop1: sGR ← Op2,    LDQ, STQ   │
   1104 ──┤─ Uop2: Store ← sGR,       STB   │    LENGTH = 8 TO 15
   1106 ──┤─ Uop3: sGR ← Op2 + 8,     STQ   │
   1108 ──┤─ Uop4: Store ← sGR,       STB   │
          └─────────────────────────────────┘
```

FIG. 11

XC INSTRUCTION

```
          ┌─────────────────────────────────┐
          │ Crack to 2 Uops.                │
   1202 ──┤─ Uop1: sGR ← Op2                │
   1204 ──┤─ Uop2: Store ← sGR xor Op1      │
          └─────────────────────────────────┘
```

FIG. 12

CRACKING DESTRUCTIVELY OVERLAPPING OPERANDS IN VARIABLE LENGTH INSTRUCTIONS

FIELD OF THE INVENTION

The present invention generally relates to microprocessors, and more particularly relates to managing variable length instructions.

BACKGROUND OF THE INVENTION

Various conventional approaches for increasing IPC (Instruction per cycle) crack instructions into a simpler set of unit of operations (Uops). However, with respect to instructions such as Mover Character (MVC) and Exclusive OR Character (XC) instructions, some conventional cracking methods only crack these instructions as MVC and XC cases. For example, MVC and XC instructions can have MVC Nbyte overlap an XC-exact cases, respectively. At execution time of these instructions, if the storage operands of the two instructions determined to destructively overlap, then the instructions are flushed and re-executed in slow manner at one byte at a time. Because these conventional methods can only identify the MVC Nbyte overlap and XC-exact cases at execution time they cannot crack the instructions based on these cases. This greatly reduces the performance of these instructions.

SUMMARY OF THE INVENTION

In one embodiment, a method for managing computer executable instructions is disclosed. The method comprises receiving at least one machine instruction for execution. The at least one machine instruction is analyzed. Responsive to identifying the machine instruction as a predefined instruction for storing a variable length first operand in a first memory location, the first operand consisting of a first plurality of first blocks. A block is defined as one or more bytes. Responsive to this identification and based on fields of the machine instruction a relative location of a variable length second operand of the machine instruction with location of the first operand is determined. The variable length second operand consists of a second plurality of second blocks. Responsive to the relative location having the predefined relationship, a first cracking operation is performed. The first cracking operation cracks the machine instruction into a first set of micro-ops (Uops) to be executed in parallel. The second set of Uops is for storing the first plurality of first blocks in the first operand. Each of said first block to be stored are identical. The first set Uops are executed.

In another embodiment, an information processing system for managing computer executable instructions is disclosed. The information processing system comprises a memory and a processor communicatively coupled to the memory. The processor comprises at least an instruction decode unit, an operand overlap determining module, and an instruction cracking unit. The instruction decode unit is configured to receive at least one machine instruction to be executed and to analyze the at least one instruction. Responsive to identifying the machine instruction as a predefined instruction for storing a variable length first operand in a first memory location, the first operand consisting of a first plurality of first blocks, the operand overlap determining module is configured to determine a relative location of a variable length second operand of the machine instruction with location of the first operand. This relative location is determined also based on fields of the machine instruction. The variable length second operand consists of a second plurality of second blocks. Responsive to the relative location having the predefined relationship, the cracking unit is configured to perform a first cracking operation. The first cracking operation cracks the machine instruction into a first set of micro-ops (Uops) to be executed in parallel. The second set of Uops is for storing the first plurality of first blocks in the first operand. Each of said first block to be stored are identical. The first set Uops are executed.

In yet another embodiment, a computer program product for managing computer executable instructions is disclosed. The computer program product comprises a storage medium readable by a processing circuit and storing instructions for execution by the processing circuit for performing a method. The method comprises receiving at least one machine instruction for execution. The at least one machine instruction is analyzed. Responsive to identifying the machine instruction as a predefined instruction for storing a variable length first operand in a first memory location, the first operand consisting of a first plurality of first blocks. Responsive to this identification and based on fields of the machine instruction a relative location of a variable length second operand of the machine instruction with location of the first operand is determined. The variable length second operand consists of a second plurality of second blocks. Responsive to the relative location having the predefined relationship, a first cracking operation is performed. The first cracking operation cracks the machine instruction into a first set of micro-ops (Uops) to be executed in parallel. The second set of Uops is for storing the first plurality of first blocks in the first operand. Each of said first block to be stored are identical. The first set Uops are executed.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3 shows an example of an MVC instruction format;

FIG. 4 shows an example of an XC instruction format;

FIG. 6 shows Uops created based on detecting an MVC-1 byte situation at decode time according to one or more embodiments of the present invention;

FIG. 7 shows Uops created based on detecting an XC-exact situation at decode time according to one or more embodiments of the present invention;

FIGS. 10-12 show various examples of Uops created based on the size of one or more operands in variable operand length instructions with non-overlapping operands according to one or more embodiments of the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Operating Environment

Figure 1:
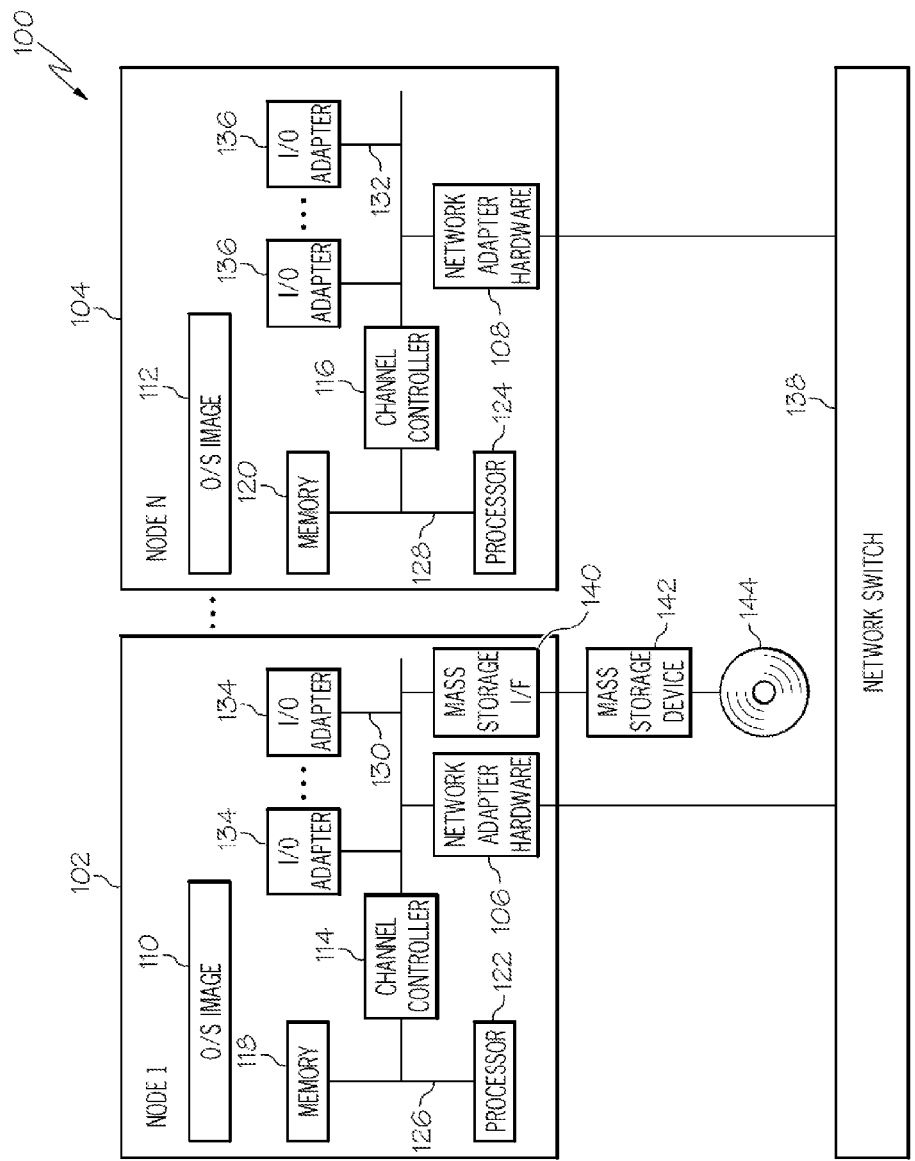
FIG. 1 illustrates one example of an operating environment according to one embodiment of the present invention.

FIG. 1 shows an exemplary operating environment applicable to various embodiments of the present invention. In particular, FIG. 1 shows a parallel-distributed processing system in which one embodiment of the present invention is implemented. In this embodiment, the parallel-distributed processing system 100 operates in an SMP computing environment. In an SMP computing environment, parallel applications can have several tasks (processes) that execute on the various processors on the same processing node. The parallel-distributed processing system 100 executes on a plurality of processing nodes 102 and 104 coupled to one another node via a plurality of network adapters 106 and 108. Each processing node 102 and 104 is an independent computer with its own operating system image 110 and 112, channel controller 114 and 116, memory 118 and 120, and processor(s) 122 and 124 on a system memory bus 126 and 128. A system input/output bus 130 and 132 couples I/O adapters 134 and 136 and communication adapter 106 and 108. Although only one processor 122 and 124 is shown in each processing node 102 and 104 for simplicity, each processing node 102 and 104 can have more than one processor. The communication adapters are linked together via a network switch 138.

Also, one or more of the nodes 102, 104 comprises mass storage interface 140. The mass storage interface 140 is used to connect mass storage devices 142 to the node 102. One specific type of data storage device is a computer readable medium such as a Compact Disc ("CD") drive, which may be used to store data to and read data from a CD 144 or DVD ("Digital Versatile Disc"). Another type of data storage device is a hard disk configured to support, for example, Journaled File System ("JFS") type file system operations. In some embodiments, the various processing nodes 102 and 104 are able to be part of a processing cluster. The present invention is not limited to an SMP environment. Other architectures are applicable as well, and further embodiments of the present invention can also operate within a single system.

Processor Core

Figure 2:
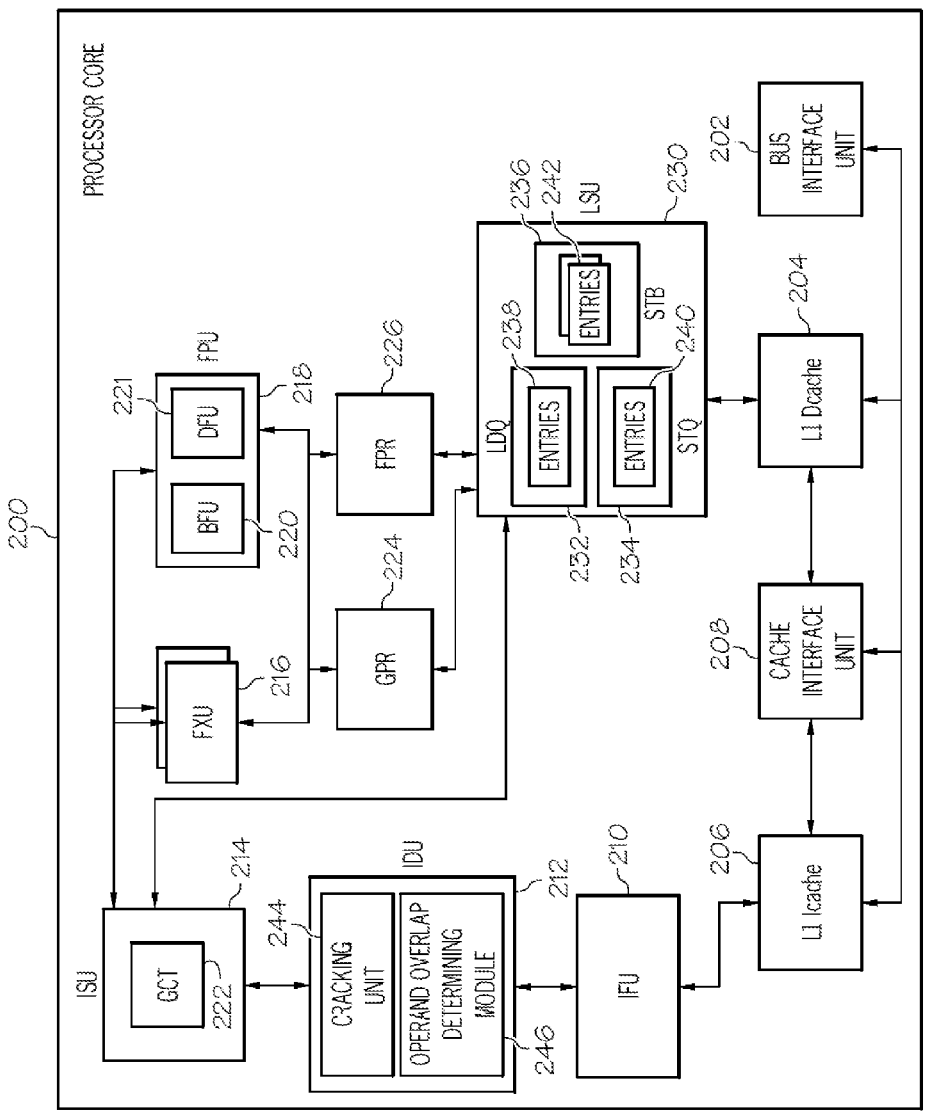
FIG. 2 illustrates a detailed view of a processing core according to one embodiment of the present invention.

According to one embodiment, FIG. 2 illustrates one example of a processor core 200 within a processor 122, 124 for cracking MVC and XC instructions based on operand displacement values and base register numbers. It should be noted that the configuration shown in FIG. 2 is only one example applicable to the presently claimed invention. In particular, FIG. 2 shows a processing core 200. The processor core 200, in one embodiment, comprises a bus interface unit 202 that couples the processor core 200 to other processors and peripherals. The bus interface unit 202 also connects L1 Dcache 204, which reads and stores data values, L1 Icache 206, which reads program instructions, and a cache interface unit 208 to external memory, processor, and other devices.

The L1 Icache 206 provides loading of instruction streams in conjunction with an instruction fetch unit IFU 210, which prefetches instructions and may include speculative loading and branch prediction capabilities. These fetched instruction codes are decoded by an IDU 212 into instruction processing data. Once decoded, the instructions are dispatched to an instruction sequencer unit (ISU) 214. The ISU 214 controls sequencing of instructions issued to various execution units such as one or more fixed point units (FXU) 216 for executing general operations and one or more floating point units (FPU) 218 for executing floating point operations. The floating point unit(s) 218 can be a binary point floating unit 220, a decimal point floating unit 221, and/or the like. It should be noted that the FXU(s) 216, in one embodiment, comprises multiple FXU pipelines, which are copies of each other. The ISU 214 is also coupled to one or more load/store units (LSU) 230 via multiple LSU pipelines. These multiple LSU pipelines are treated as execution units for performing loads and stores and address generation for branches.

A set of global completion tables (GCT) 222 residing within the ISU 214 track the instructions issued by ISU 214 via tags until the particular execution unit targeted by the instruction indicates the instructions have completed execution. The FXU 216 and FPU 218 are coupled to various resources such as general-purpose registers (GPR) 224 and floating point registers (FPR) 226. The GPR 224 and FPR 226 provide data value storage for data values loaded and stored from the L1 Dcache 204 by a load store unit (LSU) 230.

In addition, to the configuration of the processor core 200 discussed above, in one embodiment, the LSU 230 comprises a load queue (LDQ) 232, a store queue (STQ) 234, and a store buffer (STB) 236. The LDQ 232 and the STQ 234 each comprise entries 238, 240, respectively, that track additional information associated with outstanding load and store instructions. For example, the entries 238 of the LDQ 232 comprise the starting address and ending address of a corresponding load instruction. The entries 240 of the STQ 234 comprise the starting address and the ending address of corresponding store data. The STB 236 comprises entries 242 where a corresponding store instruction saves its data prior to writing the data back the cache 204.

In one embodiment, the IDU 212 comprises a cracking unit 244. The cracking unit 244 organizes/breaks a complex instruction into simpler units. Stated differently, the cracking unit 244 organizes an instruction such as an STM instruction into a set of units of operation (Uops) that can be handled in parallel paths. The cracking unit 244 is discussed in greater detail below. In one embodiment, the IDU 212 also comprises an operand overlap determining module 246 that determines the overlap of the instruction operands. For example, for an MVC instruction the operand overlap determining module 246 determines if the operands are overlapped by N bytes. For an XC instruction, the operand overlap determining module 246 determine if the operands have an exact overlap. This determination is used to crack an MVC and an XC instruction, respectively, into a given number of Uops for optimizing the rate of instruction processing; increasing the throughput of data; and reducing OSC (operand store compare) hazards.

Cracking Variable Length Instructions—Overlap Case

A move character (MVC) instruction and an exclusive OR character (XC) instruction are both storage-to-storage (SS) instructions. One type of an MVC instruction is an MVC Nbytes overlap (replicate N bytes of memory where a typical N value is 1 to 8) instruction. One type of an XC instruction is an XC-exact (clear 1 to 256 bytes in storage to value of 0's) instruction. Both of these instructions (MVC Nbytes and XC-exact) are performance critical and require fast processing and execution. Some previous generation microprocessor designs that implemented in-order execution identified these scenarios post-dispatch and added special hardware at execution time to optimize their performance. Since these microprocessor designs design were "in-order" instruction issuing would stop as long as there is a long running instruction still executing. Therefore, the MVC-Nbyte and XC-exact scenarios were detected post-dispatch and executed faster than a normal MVC or XC instruction. With respect to out-of-order microprocessor designs, the intention is to eliminate issue stalls by working around long running instructions or by cracking complex instructions into simpler Uops where the Uops can be issued and executed in parallel and out-of-order with respect to other instructions. However, conventional out-of-order microprocessor designs generally fail to improve optimize store-load hazards, bottlenecks, and queue/buffer assignments.

Therefore, in addition to the general processing mechanisms discussed above with respect to FIG. 1, one or more of the following embodiments identify MVC-Nbyte and XC-exact instructions at decode time. One or more embodiments then crack these long running instructions into multiple Uops based on opcode, base register numbers, and displacement value. This cracking of MVC-Nbyte and XC-exact instructions allows store-load bypassing from and into these cracked instructions; removes the execution bottle neck for long running operands; and simplifies the load queue, store queue, and store buffer assignment.

Cracking MVC-Nbyte and XC-exact instructions based on opcode, base register numbers, and displacement value allows the instruction to be cracked into simpler Uops that can be issued and executed in parallel with other instructions and that can fit mapper resources. Store Uops are uniquely identified and a store queue entry is assigned for each one so store data can be bypassed to longer loads. Also, load Uops are uniquely identified so a store from an older instruction can be bypassed into the load Uop.

In one embodiment, the IFU 210 fetches an instruction from the I-cache 206 and sends the instruction into the pipeline for decoding by the IDU 212. The IDU 212 decodes the instruction and determines that the instruction is an MVC or an XC instruction. Upon further analysis by the operand overlap determining module 246, which is discussed in greater detail below, the IDU 212 determines that the MVC or XC instruction is an MVC-Nbyte or an XC-exact instruction, respectively. The IDU 212 analyzes the MVC-Nbyte or XC-exact instruction to determine the opcode, base register numbers, and displacement value. The cracking unit 246 then cracks this instruction based on the opcode, base register numbers, and displacement value.

FIGS. 3-4 illustrate examples of an MVC and XC instruction. In particular, FIG. 3 illustrates an MVC instruction format and FIG. 4 illustrates an XC instruction format. As can be seen from FIGS. 3 and 4, the MVC and XC instruction formats 300, 400 comprise a set of instruction text bits 0:7. These instruction text bits are the instruction opcode. Instruction text bits 8:15 equal the operand lengths (L), e.g., L value of 0 to 255 is equivalent to 1-256 bytes in memory. Instruction text bits 16:19 (B1) comprise the base register number for the first operand. Instruction text bits 20:31 (D1) comprise the displacement value for the first operand. Instruction text bits 32:35 (B2) comprise the base register number for the second operand. Instruction text bits 36:47 (D2) comprise the displacement value for the second operand. The first operand data is at memory location (GPR-B1+D1) to (GPR-B1+D1+L) for a total of L+1 bytes. The second operand data is at memory location (GPR-B2+D2) to (GPR-B2+D2+L) for a total of L+1 bytes. The MVC instruction moves the second operand data to the first operand from left (staring address) to right byte at a time. The XC instruction performs the exclusive logic OR function between the two operands and stores the result back at first operand. Bytes are processed left (byte at the starting address) to right.

With respect to an XC instruction, for i=0 to L (total of L+1 bytes) then op1(i)<=op1(i) XOR op2(i). An XOR operation is performed byte per byte from op1 and op2. The result is stored back at op1. If op1 address=op2 address then the result will be all 0's. Therefore, the instruction looks like it is clearing to zeros a range of bytes in memory at the op1 address. With respect to an MVC instruction, for i=0 to L (total of L+1 bytes) then op1(i)<=op2(i). Therefore, if op1 address=op2 address+N then the MVC instruction looks as if it is replicating the first N bytes of op2 to op1. More specifically, in one embodiment, for N=1, the most significant byte of op2 is copied or replicated to all the bytes of op1, and the MVC with 1 Byte overlap is equivalent to a single byte padding.

Figure 5:
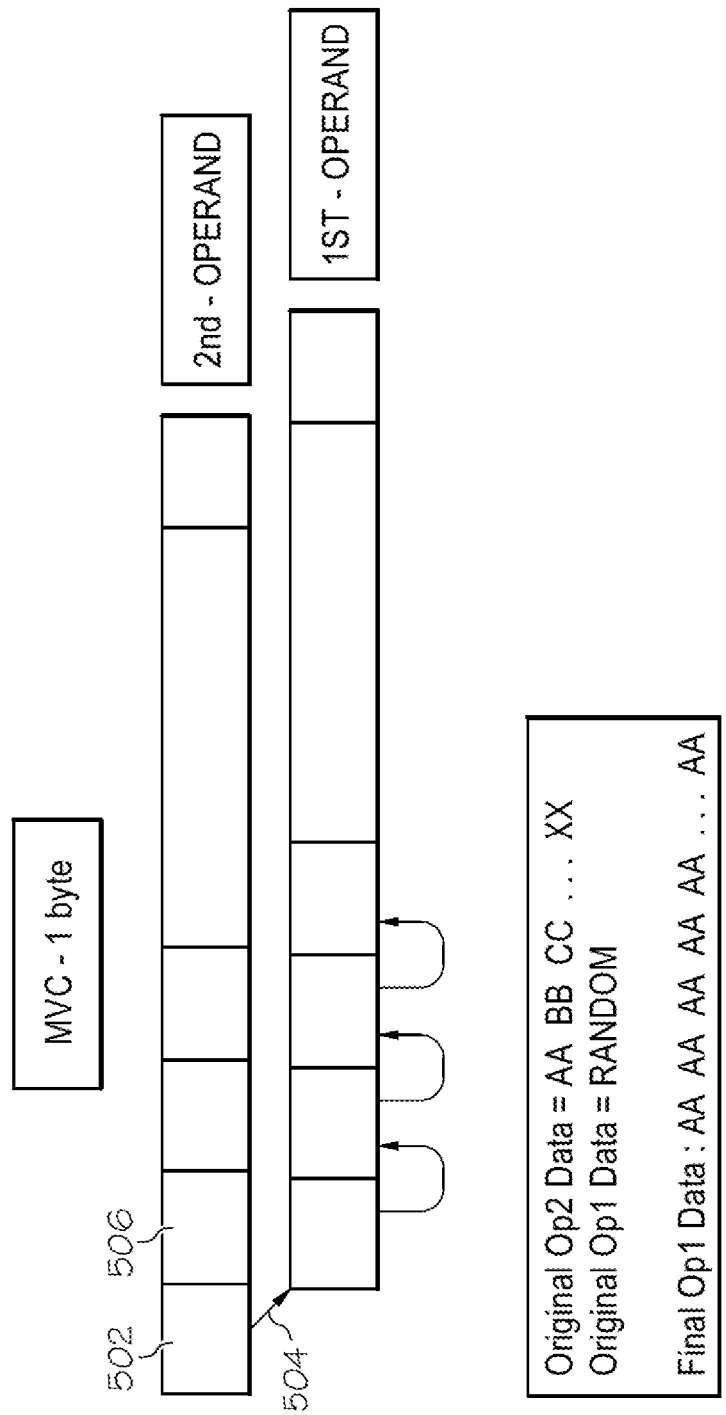
FIG. 5 illustrates an MVC-1 byte situation.

FIG. 5 shows an example of how an MVC-1 byte instruction is executed. In an MVC-1 byte instruction the first operand (op1) is 1 byte away from the second operand (op2) (i.e., the operands only differ by a 1 byte location). In order to execute this instruction the first byte 502 is read from op2 and moved to op1 as shown by the first arrow 504. Then, the second byte 506 is read from op2, but second byte 506 of op2 is the first byte of op1 which was just moved. Therefore, the byte that was just read is the byte that was just stored. So the instruction looks as if it is taking the most significant byte (e.g., AA) of op2 and replicating it across op1 (e.g., final operand data is AA AA AA AA AA . . . AA). This process is referred to as padding.

Returning to the IDU 212, once the IDU 212 receives the instruction from the IFU 210, the IDU 212 decodes the instruction and identifies the opcode as indicated by bits 0 to 7. In the current example, the IDU 212 identifies the instruction as either an MVC or an XC instruction. The operand overlap determining module 246 then analyzes the base registers and the displace fields of the operands for the received instruction to identify the overlap between the operands. An MVC instruction is identified by the IDU 212 as an MVC-1 byte instruction when the overlap determining module 246 determines that B1==B2 and D2+1==D1). When software wants to perform 1 byte padding the software uses the same base register. So base 1 (B1) is equal to base 2 (B2) and the displacement of op1 is one more than op2. Therefore, B 1+D1 is 1 greater than B2+D2. It should be noted that although the examples used throughout this discussion are directed to 1 byte padding, the present invention is also applicable to other types of padding such as 2 byte to 8 byte padding.

An XC instruction is identified by the IDU 212 as an XC exact instruction when the overlap determining module 246 determines that B1==B2 and D1==D2. When software application wants to clear certain bytes in memory by using the XC instruction in almost all cases the B1 and B2 fields are the same. This is because only one general purpose register (GPR) is used to represent the base and displacement field is changed to be the same at compile time. Therefore, an XC instruction is an XC exact instruction when B1=B2 and D1=D2.

Upon detecting a 1 byte (or N bytes with typical N is from 1 to 8) in an MVC instruction, the cracking unit 244 of the IDU 212 cracks the instruction regardless of operand length to optimize the execution performance. The instruction is also cracked to have each Uop to be in a simple pipelinable to optimize the issue bandwidth and to allow bypassing into and from the MVC operands. The cracking unit 244 breaks/organizes the MVC instruction into a group of Uops based on the identified opcode, base register values, and displacement field. These opcodes are then sent to the ISU 214 for issuing to the execution units. In one example, the MVC instruction is cracked into 3 Uops. The cracking is performed during decode and instruction grouping cycles. Each Uop has its own logical register assignments, Condition Code read/write conditions, load queue, store queue, and store buffer allocation and usage, etc.

FIG. 6 shows an example of how the cracking unit 244 cracks the MVC-1byte instruction into multiple Uops. As can be seen from FIG. 6, the cracking unit 244 has broken the MVC- 1byte instruction into a set of Uops ranging from Uop 1 to Uop3. Once the cracking unit 244 has formed the Uops, the IDU 212 sends the Uops to the ISU 214. Uop1 performs a load from op2, e.g., reads a single byte or pads a blank byte from op2. Therefore, an LDQ entry is allocated for op2, a STQ entry is allocated to Uop1, and one STB is allocated for op 1 data to be saved into regardless of the operand length. These allocations are performed in order at dispatch time of the Uops. It should be noted that although up to 256 bytes can be stored and would normally require assignments of 32 store buffers each containing 8 bytes of storage data, this embodiment only allocates a single store buffer populated with eight replicated bytes at execution time. The same storage buffer entry is referenced over and over again when the data is written back to the cache. Therefore, a large number of resources in the storage buffer are saved. This is achieved, in one embodiment, by pinning the store buffer read pointers to the single entry that pertains to the MVC-1B. This store buffer entry is read as many times as necessary to populate the up to 256 bytes of storage.

Uop1 is a load instruction that fetches a single byte from the op2 and places this data into a scratch GR. Uop2, in this embodiment, is a dual issue Uop. For example, the first issue is an LSU issue, where Uop2 calculates the storage address (op I address) and performs pretesting to check for any potential exception related to this storage access at this particular address. The second issue is a FXU issue where Uop2 reads the data from the scratch GR, replicates the byte that has just been read, and sends the data to the STB. Uop3 is optional and pretests the ending address of op 1 to check for any potential exceptions. Because op 1 is able to span over two cache lines, Uop3 ensures that all storage cache lines are tested for an exception when storage data crosses a cache line boundary. It should be noted that Uop3 is optional depending on the hardware being implemented Returning to the XC-exact instruction, the operand overlap determining module 246 compares base1 (B1) and base2 (B2) of the instruction and also displacement1 (D1) and displacement2 (D2). If B1+D1=B2+D2 then the address of both operands (op1 and op2) overlap exactly. Since this instruction clears out the memory, data is not fetched from memory. Upon detecting an exact operand overlap for an XC instruction, the cracking unit 244 of the IDU 212 cracks the instruction regardless of length to optimize the execution performance, to use minimum hardware resources and to allow operand store compare bypassing. The cracking unit 244 breaks/organizes the XC instruction into a group of Uops based on the identified opcode, base register values, and displacement field. These opcodes are then sent to the ISU 214 for issuing to the execution units. In one example, the XC instruction is cracked into 2 Uops. The cracking is performed during decode and instruction grouping cycles. Each Uop has its own logical register assignments, Condition Code read/write conditions, load queue, store queue, and store buffer allocation and usage, etc.

FIG. 7 shows the Uops for an XC-exact overlap instruction. As can be seen from FIG. 7, the cracking unit 244 has broken the XC instruction into a set of Uops ranging from Uop 1 to Uop2. Once the cracking unit 244 has formed the Uops, the IDU 212 sends the Uops to the ISU 214. Uop1 is similar to a store instruction that stores all zeros as its data. Uop1 is a dual issued Uop, however, in other embodiments, Uop1 can be single issued where the op1 address is generated since the storage data is known to be zeros. The first issue is an LSU issue where Uop1 forms the operand address and tests the cache address for any store related exceptions. The second issue is a FXU issue where Uop1 is an FXU issue. This second issue sends all 0's as a databeat to the STB to be stored. Uop1 also allocates only one STQ and one STB regardless of the operand length. Uop2 performs a pretest on the ending address of op 1 for any potential exceptions. Because op 1 is able to span over two cache pages, Uop2 ensures that all storage cache lines are tested for an exception when storage data crosses a cache page boundary. Uop2 is added to the cracking sequence since existing hardware implementations generally cannot test two different cache lines in one Uop since they may span a memory page. It should be also noted that although up to 256 bytes can be stored and would normally require assignments of 32 store buffers each containing 8 bytes of storage data, this embodiment only allocates a single store buffer populated with eight replicated bytes at execution time. The same storage buffer entry is referenced over and over again when the data is written back to the cache. Therefore, a large number of resources in the storage buffer are saved. This is an XC-exact scenario. This store buffer entry is read as many times as necessary to populate the up to 256 bytes of storage.

Operational Flow Diagrams—Overlap Case and Non-Overlap cases

Figure 8:
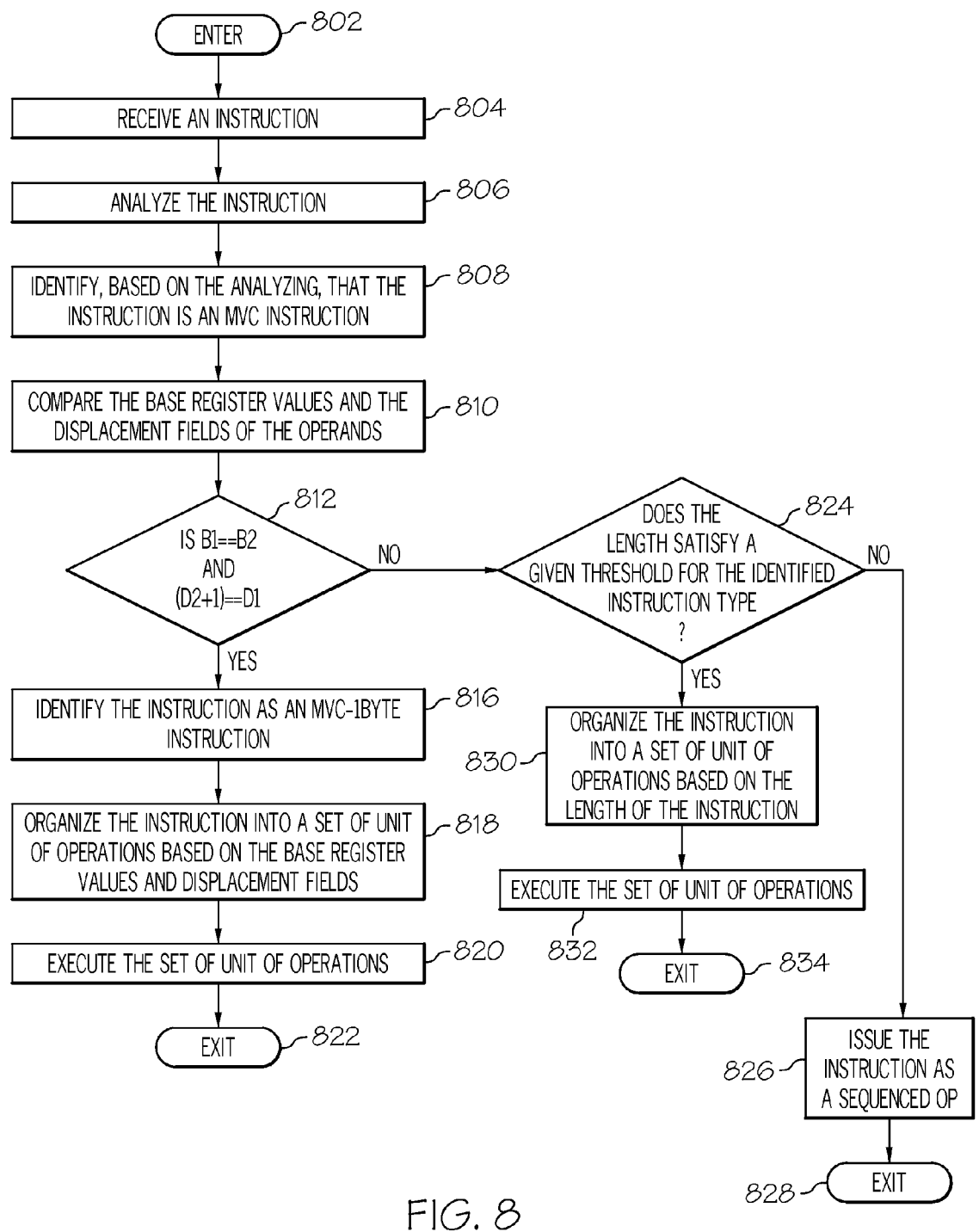
FIG. 8 is an operational flow diagram illustrating one example of cracking a variable length instruction based on its displacement value and base register numbers according to one or more embodiments of the present invention.

FIG. 8 is an operational flow diagram illustrating one example of managing MVC-1byte instructions. The operational flow diagram of FIG. 8 beings at step 802 and flows directly into step 804. The IDU 212, at step 804, receives an instruction. The IDU 212, at step 806, analyzes the instruction. The IDU 212, at step 808, determines that the instruction is an MVC instruction based on the analyzing. The IDU 212, via the operand overlap determining module 246, at step 810, compares the base register values and the displacement fields of the operands.

Based on this comparison, the IDU 212, at step 812, determines if the base register (B1) of the first operand is equal to the base register (B2) of the second operand and if the displacement value (D2) of the second operand plus N, such as N=1 when testing for 1byte overlap, is equal to the displacement value (D1) of the first operand. If the result of this determination is negative, the instruction is a normal MVC instruction and the control flow goes to step 824 where length based cracking is performed. The IDU 212, at step 824, determines if the length satisfies a given threshold for the identified instruction type, e.g., is the length equal to 1 to 8 bytes, as will be discussed below with respect to FIGS. 10-12 in the non-overlap case. If the result of this determination is negative, the IDU 212, at step 826, issues the instruction as a sequenced op. The control flow then exits at step 828. If the result of this determination is positive, the IDU 212, at step 830, organizes the instruction into a set of unit of operations that can be executed in parallel based on the length of the instruction. This organization or cracking is discussed below in more detail with respect to FIGS. 10-12. The IDU 212, at step 832, executes the set of unit of operations. The control flow then exits at step 834. For more information on this non-overlap case, see commonly owned U.S. Patent Application Serial No. 12/707,163 entitled "Instruction Length Based Cracking For Instruction Of Variable Length Storage Operands", which is hereby incorporated by reference in its entirety. Continuing with the overlap case, if the result of this determination is positive, the IDU 212, at step 816, identifies this instruction as an MVC-1 byte instruction. The IDU 212, at step 818, organizes the instruction into a set of unit of operations that can be executed in parallel based on the base registers and displacement values. This organization or cracking has been discussed above in more detail with respect to FIG. 6. The IDU 212, at step 820, executes the set of unit of operations. The control flow then exits at step 822.

Figure 9:
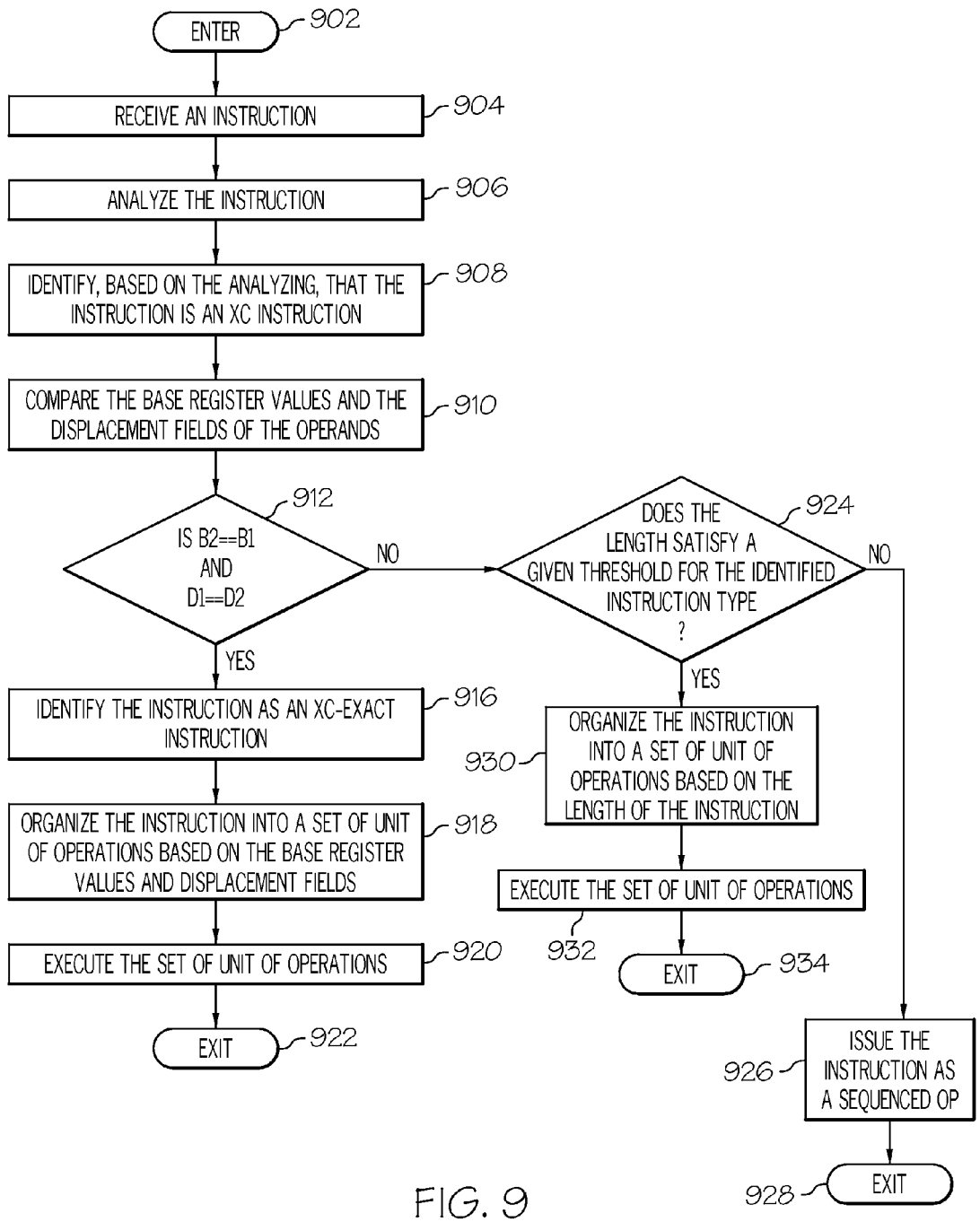
FIG. 9 is an operational flow diagram illustrating one examples of cracking a variable length instruction based on its displacement value and base register numbers according to one or more embodiments of the present invention.

FIG. 9 is an operational flow diagram illustrating one example of managing XC-exact instructions. The operational flow diagram of FIG. 9 beings at step 902 and flows directly into step 904. The IDU 212, at step 904, receives an instruction. The IDU 212, at step 906, analyzes the instruction. The IDU 212, at step 908, determines that the instruction is an XC instruction based on the analyzing. The IDU 212, via the operand overlap determining module 246, at step 910, compares the base register values and the displacement fields of the operands.

Based on this comparison, the IDU 212, at step 912, determines if the base register (B2) of the second operand is equal to the base register (B1) of the first operand and if the displacement value (D1) of the first operand is equal to the displacement value (D2) of the second operand. If the result of this determination is negative, the instruction is a normal XC instruction and the control flow exits at step 924 where length based cracking is performed. The IDU 212, at step 924, determines if the length satisfies a given threshold for the identified instruction type, e.g., is the length equal to 1 to 8 bytes, as will be discussed below with respect to FIGS. 10-12 in the non-overlap case. If the result of this determination is negative, the IDU 212, at step 926, issues the instruction as a sequenced op. The control flow then exits at step 928. If the result of this determination is positive, the IDU 212, at step 930, organizes the instruction into a set of unit of operations that can be executed in parallel based on the length of the instruction. This organization or cracking s discussed below in more detail with respect to FIGS. 10-12. The IDU 212, at step 932, executes the set of unit of operations. The control flow then exits at step 934. For more information on this non-overlap case, Returning to the overlap case, if the result of this determination is positive, the IDU 212, at step 916, identifies this instruction as an XC-exact instruction. The IDU 212, at step 918, organizes the instruction into a set of unit of operations that can be executed in parallel based on the base registers and displacement values. This organization or cracking has been discussed above in more detail with respect to FIG. 7. The IDU 212, at step 920, executes the set of unit of operations. The control flow then exits at step 922.

Cracking Non-Overlap Instructions

One or more of the following embodiments crack variable operands length instructions, (e.g., MVC, XC) based on opcode and the length of the operands. Cracking improves the issue bandwidth, store-load data bypassing, and removes hardware complexity from execution units, among other things. Cracking long running instruction based on opcode and length(s) fields to many Uops allows store-load bypassing from and into these cracked instructions; removes the execution bottle neck for long running ops, and simplifies the load queue, store queue and store buffer assignment.

Cracking variable operands length instructions, such as MVC and XC based on opcode and the length of the operands allows the instruction to be cracked into simpler Uops that can be issued and executed in parallel and that can fit mapper resources. Store Uops are uniquely identified and a store queue entry is assigned for each one so store data can be bypassed to longer loads. Also, load Uops are uniquely identified so a store from an older instruction can be bypassed into the load Uop.

In one embodiment, the IFU 210 fetches an instruction from the I-cache 206 and sends the instruction into the pipeline for decoding by the IDU 212. The IDU 212 decodes the instruction and determines that the instruction has variable operands length. The IDU 212 analyzes the instruction to determine the opcode and an operand length determining module (not shown) determines the length(s) of operands. The cracking unit 244 then cracks this instruction based on the opcode and the length(s).

FIGS. 10-12 show various examples how the cracking unit 244 cracks variable operands lengths instructions such as SS-logical and SS-decimal instructions into multiple Uops. FIGS. 10-12 show an example of Uops for an MVC instruction that has operands length value ranging from 0 to 15 (1 to 16 bytes). The MVC instruction moves a specified number of bytes from opt to op2. In particular, FIG. 10 shows the Uops for an MVC instruction that is 1 to 8 bytes (L value is 0 to 7) in operands length and FIG. 11 shows the Uops when the MVC instruction is 9 to 16 bytes (L value is 8 to 15) in operands length. It should be noted that various embodiments of the present invention are not limited to only cracking an MVC instruction (or any other instruction) with operands length from 0 to 15 (1 to 16 bytes), as instructions with greater operands lengths can also be cracked as well.

As can be seen from FIG. 10, the cracking unit 244 has broken the MVC instruction into a set of Uops ranging from Uop 1 to Uop2 when the operand length of the MVC instruction is 0 to 7 (1 to 8 bytes). Once the cracking unit 244 has formed the Uops, the IDU 212 sends the Uops to the ISU 214. Uop1 1002 performs a load from op2, e.g., reads 1 to 8 bytes from op2. Therefore, an LDQ entry is allocated for op2, a STQ entry is allocated to Uop1 1002 (STQ entry could have allocated with the dispatch of Uop2 1104), and a STB is allocated for op 1 data to be saved into. These allocations are performed in order at dispatch time. Uop1 1002 fetches (loads) 1 to 8 bytes of op2 from memory and places this data into a scratch GR. Uop2 1004, in this embodiment, is a dual issue Uop. For example, the first issue is an LSU issue, where Uop2 1004 calculates the storage addresses (op 1 to op 1+L) and performs pretesting to check for any potential exception related to this storage access at this particular address. The second issue is a FXU issue where Uop2 1004 reads the data from the scratch GR and sends the data to the STB.

FIG. 11 show that the cracking unit 244 has broken the MVC instruction into a set of Uops ranging from Uop 1 to Uop4 (2 loads followed by 2 stores) when the operand length of the MVC instruction is 8 to 15(9 to 16 bytes). Once the cracking unit 244 has formed the Uops, the IDU 212 sends the Uops to the ISU 214. An LDQ entry is allocated for op2, a STQ entry is allocated to Uop1 1102 (STQ entry could have allocated with the dispatch of Uop2 1104) , and a STB is allocated for op1 data to be saved into. These allocations are performed in order at dispatch time. Uop1 1102 loads 8 bytes of op2 (op2 to op2+7) from memory and places this data into a scratch GR. Uop2 1104, in this embodiment, is a dual issue Uop. For example, the first issue is an LSU issue, where Uop2 1104 calculates the storage address (op 1 to op1+7) and performs pretesting to check for any potential exception related to this storage access at this particular address. The second issue is a FXU issue where Uop2 1104 reads the data from placed in the scratch GR by Upo1 and sends the data to the STB.

Uop3 1106 fetches the remaining op2 data (op2+8 to op2+L) from memory, i.e., the next potential 8 bytes after the data loaded by Uop1, and places this data into a scratch GR. Uop4 1108, in this embodiment, is a dual issue Uop. For example, the first issue is an LSU issue, where Uop4 1108 calculates the storage addresses where the data is going to be stored (op1+8 to op1+L) and performs pretesting to check for any potential exception related to this storage access at this particular address. The second issue is a FXU issue where Uop4 1108 reads the data placed in the scratch GR by Upo3 and sends the data to the STB. It should be noted that if the operands length of the MVC instruction is greater than 16 bytes (L is greater than 16) the MVC instruction is issued to the LSU 230 as a sequenced op with an allocated LDQ and STQ and the LSU cannot execute any other instructions until the MVC instruction has completed.

FIG. 12 shows the Uops for an XC instruction with operands lengths ranging from 0 to 7 (1 to 8 bytes). As can be seen from FIG. 12, the cracking unit 244 has broken the XC instruction into a set of Uops ranging from Uop 1 to Uop2. Once the cracking unit 244 has formed the Uops, the IDU 212 sends the Uops to the ISU 214. There is an LDQ entry, an STQ and STB entry allocated for opt, and an LDQ entry is allocated for op2. Uop 1 1202 loads 1 to 8 bytes of op2 data from memory and places this data into a scratch GR. Uop2 1204, in this embodiment, is a dual issue Uop. For example, the first issue is an LSU issue, where Uop2 1204 calculates the storage address for fetching up to 8 bytes from op 1 and performs pretesting to check for any potential exception related to this storage access at this particular address. The second issue is a FXU issue where Uop2 1204 brings the fetched data from op 1 to the FXU 216. The FXU 216 performs an Xor operation between the op2 data in the scratch GR and the op1 data bytes fetched by Uop2. The result of the Xor operation is sent back to the LSU for storing in the STB, and the condition code is set based on the result value. It should be noted that if the operands lengths of the XC instruction is greater than 8 bytes (L is greater than 8) the XC instruction is issued to the LSU 230 as a sequenced op with an two allocated LDQs, one allocated STQ, and one allocated STB and the LSU cannot execute any other instructions until the XC instruction has completed.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a program product via CD or DVD, e.g. CD, CD ROM, or other form of recordable media, or via any type of electronic transmission mechanism.

What is claimed is:

1. A method for managing computer executable instructions, the method comprising:
    receiving, by a processor, at least one machine instruction for execution;
    analyzing, by an instruction decode unit of the processor, the at least one machine instruction;
    based on the instruction decode unit determining that the machine instruction is a predefined instruction for storing a variable length byte stream as a first operand in a first memory location identified by the machine instruction, the first operand consisting of a first plurality of first blocks,
        determining, by an operand-overlap-determining-module within the instruction decode unit of the processor during at least one instruction decoding cycle and based on instruction text bits within the machine instruction, a relative location of a second operand identified by the machine instruction with respect to the first memory location of the first operand, the second operand in a second memory location identified by the machine instruction, the second operand consisting of a second plurality of second blocks;
    based on the relative location having a first predefined relationship, performing, by an instruction cracking unit within the instruction decode unit of the processor during at least one instruction decoding cycle, a first cracking operation cracking the machine instruction into a first set of micro-ops (Uops), wherein each Uop in the first set of Uops is executable in parallel with other machine instructions and Uops, and wherein each Uop in the first set of Uops is executable out-of-order;
    sending the first set of Uops to an instruction sequencer unit;
    issuing a first Uop in the first set of Uops to a first execution unit;
    issuing at least a second Uop in the first set of Uops to at least a second execution unit; and
    executing, by the first and second execution units, first Uop and the second Uop, respectively, the executing causing a single block to be stored in each of the first plurality of first blocks of the first operand, the single block consisting of replicated single values.

2. The method of claim 1, further comprising based on the relative location having a second predefined relationship, performing a second cracking operation, the second cracking operation cracking the machine instruction into a second set of Uops; and
    executing the second set of Uops, the second set of Uops causing the second plurality of second blocks to be stored as the first plurality of first blocks in first operand.

3. The method of claim 1, wherein the first set of Uops comprises
    a Uop to replicate a single value as the single block into a scratch register; and
    a Uop to store the single block in each of the first blocks of the first operand.

4. The method of claim 1, wherein the first set of Uops comprises
    one or more Uops to form an operand address and pretest a cache address, and wherein the Uop one or more Uops also send a databeat comprising all zeros to a store buffer, and one or more Uops to pretest on an ending address of an operand.

5. The method of claim 1, wherein the machine instruction being a predefined instruction is one of a Move Character (MVC) instruction for moving characters of data from one location in memory to another location in memory and an eXclusive-OR (XOR) Character (XC) instruction for XORing characters of a data of two locations in memory to be stored at one of the two locations.

6. The method of claim 1, wherein analyzing the at least one machine instruction for execution comprises:
analyzing a set of displacement fields and a set of base register values associated with the at least one machine instruction;
determining that a first base register value is equal to a second base register value and if a second displacement value plus N is equal to a first displacement value, wherein the first base register value and the first displacement value are configured to determine the first memory location, wherein the second base register value and the second displacement value are configured to determine the second memory location; and
identifying, based on the determining, that the machine instruction is a MVC-Nbyte instruction.

7. The method of claim 1, wherein analyzing the at least one machine instruction for execution comprises:
analyzing a set of displacement fields and a set of base register values associated with the at least one machine instruction, the at least one machine instruction configured to perform an eXclusive-OR (XOR) operation;
determining that a first base register value is equal to a second base register value and a first displacement value is equal to a second displacement value; and
wherein the executing comprises executing, based on the determining, set of Uops causing values of each one of said second blocks to be XOR'd with a value of a corresponding first block to be stored as a new first block.

8. An information processing system for managing computer executable instructions, the information processing system comprising:
a memory;
a processor communicatively coupled to the memory, wherein the processor comprises at least:
an instruction decode unit comprising an operand-overlap-determining-module and an instruction cracking unit;
an instruction sequencer unit; and
one or more execution units, the instruction decode unit being configured to perform a method comprising
receiving at least one machine instruction for execution; and
analyzing the at least one machine instruction;
based on the machine instruction being a predefined instruction for storing a variable length byte stream as a first operand in a first memory location identified by the machine instruction, the first operand consisting of a first plurality of first blocks,
the operand-overlap-determining-module being configured to perform a method comprising
determining, during at least one instruction decoding cycle and based on instruction text bits within the machine instruction, a relative location of a second operand identified by the machine instruction with respect to the first memory location of the first operand, the second operand in a second memory location identified by the machine instruction, the second operand consisting of a second plurality of second blocks,
the instruction cracking unit being configured to perform a method comprising
based on the relative location having a first predefined relationship, performing a first cracking operation during at least one instruction decoding cycle, the first cracking operation cracking the machine instruction into a first set of micro-ops (Uops), wherein each Uop in the first set of Uops is executable in parallel with other machine instructions and Uops, and wherein each Uop in the first set of Uops is executable out-of-order
the instruction sequencer unit being configured to perform a method comprising
receiving the first set of Uops; and
issuing a first Uop in the first set of Uops to a first execution unit;
issuing at least a second Uop in the first set of Uops to at least a second execution unit, the first execution unit and the second execution unit being configured to perform a method comprising
executing, after the issuing, the first Uop and the second Uop, respectively, the executing causing a single block to be stored in each of the first plurality of first blocks of the first operand, the single block consisting of replicated single values.

9. The information processing system of claim 8, wherein the first set of Uops comprises
a Uop to replicate a single value as the single block into a scratch register; and
a Uop to store the single block in each of the first blocks of the first operand.

10. The information processing system of claim 8, wherein the first set of Uops comprises
one or more Uops to form an operand address and pretest a cache address, and wherein the one or more Uops also send a databeat comprising all zeros to a store buffer, and
one or more Uops to pretest on an ending address of an operand.

11. The information processing system of claim 8, wherein the machine instruction being a predefined instruction is one of a Move Character (MVC) instruction for moving characters of data from one location in memory to another location in memory and an eXclusive-OR (XOR) Character (XC) instruction for XORing characters of a data of two locations in memory to be stored at one of the two locations.

12. A computer program product for managing computer executable instructions, the computer program product comprising:
a non-transitory storage medium readable by a processing circuit and storing instructions for execution by the processing circuit for performing a method comprising:
receiving, by a processor, at least one machine instruction for execution;
analyzing, by an instruction decode unit of the processor, the at least one machine instruction;
based on the instruction decode unit determining that machine instruction is a predefined instruction for storing a variable length byte stream as a first operand in a first memory location identified by the machine instruction, the first operand consisting of a first plurality of first blocks,
determining, by an operand-overlap-determining-module within the instruction decode unit of the processor during at least one instruction decoding cycle and based on instruction text bits within the machine instruction, a relative location of a second operand identified by the machine instruction with respect to the first memory location of the first operand, the second operand in a second memory location identified by the machine instruction, the second operand consisting of a second plurality of second blocks;

based on the relative location having a first predefined relationship, performing, by an instruction cracking unit within the instruction decode unit of the processor during at least one instruction decoding cycle, a first cracking operation cracking the machine instruction into a first set of micro-ops (Uops), wherein each Uop in the first set of Uops is a separate executable machine instruction and is executable in parallel with other machine instructions, and wherein each Uop in the first set of Uops is executable out-of-order;

sending the first set of Uops to an instruction sequencer unit;

issuing a first Uop in the first set of Uops to a first execution unit;

issuing at least a second Uop in the first set of Uops to at least a second execution unit: and executing, by the first and second execution units, the first Uop and the second Uop, respectively, the executing causing a single block to be stored in each of the first plurality of first blocks of the first operand, the single block consisting of replicated single values.

13. The computer program product of claim 12, further comprising based on the relative location having a second predefined relationship, performing a second cracking operation, the second cracking operation cracking the machine instruction into a second set of Uops; and executing the second set of Uops, the second set of Uops causing the second plurality of second blocks to be stored as the first plurality of first blocks in first operand.

14. The computer program product of claim 12, wherein the first set of Uops comprises a Uop to replicate a single value as the single block into a scratch register; and a Uop to store the single block in each of the first blocks of the first operand.

15. The computer program product of claim 12, wherein the first set of Uops comprises one or more Uops to form an operand address and pretest a cache address, and wherein the one or more Uops also send a databeat comprising all zeros to a store buffer, and one or more Uops to pretest on an ending address of an operand.

16. The computer program product of claim 12, wherein the machine instruction being a predefined instruction is one of a Move Character (MVC) instruction for moving characters of data from one location in memory to another location in memory and an eXclusive-OR (XOR) Character (XC) instruction for XORing characters of a data of two locations in memory to be stored at one of the two locations.

17. The computer program product of claim 12, wherein analyzing the at least one machine instruction for execution comprises:

analyzing a set of displacement fields and a set of base register values associated with the at least one machine instruction;

determining that a first base register value is equal to a second base register value and if a second displacement value plus N is equal to a first displacement value, wherein the first base register value and the first displacement value are configured to determine the first memory location, wherein the second base register value and the second displacement value are configured to determine the second memory location; and identifying, based on the determining, that the machine instruction is a MVC-Nbyte instruction.

18. The computer program product of claim 12, wherein analyzing the at least one machine instruction for execution comprises:

analyzing a set of displacement fields and a set of base register values associated with the at least one machine instruction, the at least one machine instruction configured to perform an eXclusive-OR (XOR) operation;

determining that a first base register value is equal to a second base register value and a first displacement value is equal to a second displacement value; and wherein the executing comprises executing, based on the determining, a set of Uops causing values of each one of said second blocks to be XOR'd with a value of a corresponding first block to be stored as a new first block.

19. The information processing system of claim 8, wherein the instruction cracking unit is further configured to perform a method comprising based on the relative location having a second predefined relationship, performing a second cracking operation, the second cracking operation cracking the machine instruction into a second set of Uops; and executing the second set Uops, the second set of Uops causing the second plurality of second blocks to be stored as the first plurality of first blocks in first operand.

20. The information processing system of claim 9, wherein the first set of Uops further comprises one or more Uops to calculate and pretest a storage address of the first operand.

21. The information processing system of claim 20, wherein the Uop that replicates the single value further allocates one load queue, one store queue, and one store buffer, wherein during write back to a cache the one store buffer is repeatedly read to populate the cache with a given number of bytes.

22. The information processing system of claim 10, wherein the Uop that forms the operand address further allocates the store buffer and one store queue, wherein during write back to a cache the store buffer is repeatedly read to populate the cache with a given number of bytes.

23. The information processing system of claim 8, wherein analyzing the at least one machine instruction for execution comprises:

analyzing a set of displacement fields and a set of base register values associated with the at least one machine instruction;

determining that a first base register value is equal to a second base register value and if a second displacement value plus N is equal to a first displacement value, wherein the first base register value and the first displacement value are configured to determine the first memory location, wherein the second base register value and the second displacement value are configured to determine the second memory location; and identifying, based on the determining, that the machine instruction is a MVC-Nbyte instruction.

24. The information processing system of claim 11, wherein analyzing the at least one machine instruction for execution comprises:

analyzing a set of displacement fields and a set of base register values associated with the at least one machine instruction, the at least one machine instruction configured to perform an eXclusive-OR (XOR) operation;

determining that a first base register value is equal to a second base register value and a first displacement value is equal to a second displacement value; and wherein the executing comprises executing, based on the determining, a set of Uops causing values of each one of said second blocks to be XOR'd with a value of a corresponding first block to be stored as a new first block.

* * * * *